United States Patent
Huang et al.

(10) Patent No.: US 8,706,825 B2
(45) Date of Patent: Apr. 22, 2014

(54) METHOD AND SYSTEM FOR IMPLEMENTING INSTANT MESSAGE AND E-MAIL INTERWORKING

(75) Inventors: Zheng Huang, Shenzhen (CN); Fengjun Li, Shenzhen (CN); Ghazanfar Ali, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 13/258,308

(22) PCT Filed: Apr. 9, 2010

(86) PCT No.: PCT/CN2010/071661
§ 371 (c)(1),
(2), (4) Date: Mar. 4, 2012

(87) PCT Pub. No.: WO2011/029300
PCT Pub. Date: Mar. 17, 2011

(65) Prior Publication Data
US 2012/0191787 A1     Jul. 26, 2012

(30) Foreign Application Priority Data
Sep. 11, 2009  (CN) .......................... 2009 1 0092396

(51) Int. Cl.
*G06F 15/16*       (2006.01)
(52) U.S. Cl.
USPC ........................ 709/206; 379/88.13; 715/752
(58) Field of Classification Search
CPC ......... H04L 51/36; H04L 51/04; H04L 51/32; H04I 51/06
USPC .................... 709/206, 204; 455/412.1, 414.4; 715/752, 758; 379/88.13, 88.14, 88.22
See application file for complete search history.

(56) References Cited

U.S. PATENT DOCUMENTS

2004/0215721 A1    10/2004  Szeto et al.
(Continued)

FOREIGN PATENT DOCUMENTS

| | | |
|---|---|---|
| CN | 101072189 A | 11/2007 |
| CN | 101079785 A | 11/2007 |
| CN | 101594318 A | 12/2009 |
| JP | 2004241946 A | 8/2004 |

OTHER PUBLICATIONS

International Search Report in international application No. PCT/CN2010/071661, mailed on Jul. 22, 2010.
English Translation of the Written Opinion of the International Search Authority in international application No. PCT/CN2010/071661, mailed on Jul. 22, 2010.

(Continued)

*Primary Examiner* — Frantz Jean
(74) *Attorney, Agent, or Firm* — Oppedahl Patent Law Firm LLC (57) ABSTRACT

The disclosure discloses a method for implementing instant message and E-mail interworking, comprising: corresponding an IM user applying a service of IM and E-mail interworking to at least one E-mail address, either being constructed from an IM address of the IM user or being a pre-allocated E-mail address; determining the E-mail address or IM address of a destination user from a received IM or a received E-mail from a user, converting the IM into a E-mail or the E-mail into an IM, and sending the E-mail or IM to the determined receiving address of the destination user. The disclosure also discloses a system for implementing IM and E-mail interworking. The disclosure realizes a free interworking between IM and E-mail.

12 Claims, 6 Drawing Sheets

(56) References Cited

U.S. PATENT DOCUMENTS

2006/0031334 A1* 2/2006 Kim .......................... 709/206
2008/0037582 A1   2/2008 Wang
2008/0208984 A1* 8/2008 Rosenberg et al. ........ 709/206
2008/0275958 A1* 11/2008 Lee et al. .................. 709/206

OTHER PUBLICATIONS

Supplementary European Search Report in European application No. 10814902.2, mailed on Dec. 11, 2013. (5 pages—see entire document).

* cited by examiner

METHOD AND SYSTEM FOR IMPLEMENTING INSTANT MESSAGE AND E-MAIL INTERWORKING

TECHNICAL FIELD OF THE INVENTION

The disclosure relates to a technique for implementing instant message (IM) and Electronic mail (E-mail) interworking, and more particularly, to a method and system for implementing IM and E-mail interworking.

BACKGROUND OF THE INVENTION

E-mail is one of the most widely used services on the internet, and a user can communicate with another network user at any corner of the world at a very low price through an E-mail system on the network. An E-mail can be in various forms, such as text, image, sound and the like. Each E-mail user has an E-mail address which is typically in the format of abc@xyz, in which what are before @ represent the character combination or code of an individual user, and what are after @ represent a name of a server providing E-mail service to the user, for example, user@hotmail.com. The main basic protocols involved include Simple Mail Transfer Protocol (SMTP), Post Office Protocol 3 (POP3), etc. IM is another service provided through the internet, that is to say, information received from a sender is forwarded to a receiver without storage and messages can be exchanged between a receiving terminal and a sending terminal directly. The involved protocols include Extensible Message and Presence Protocol (XMPP), SIP Instant Message and Presence Leveraging Extensions (SIMPLE), Message Session Relay Protocol (MSRP) and the like. Currently, one of the directions of development is implementing the IM using the Session Initiation Protocol (SIP) based protocol.

E-mail and IM are the main two types of message services on the internet. Users are using both Internet communication tools such as E-mails and Ns, etc. and telecommunication network communications such as short messages and multimedia messages, etc. Currently, the converged messaging service is proposed in the industry, so that a user can exchange messages with anyone using different technologies, media and user terminals anytime and anywhere. To implement the converged messaging service, one way is to provide a converged messaging service system, which provides service users with complete, consistent and convenient messaging service experience. Service users can intercommunicate with each other by IM technique based converged message, and can also intercommunicate with users of the above mentioned various traditional messaging service rather than the converged messaging service. One of the important aspects of interworking is the interworking between converged message and E-mail. As the converged message is based on the IM technique, the converged message and E-mail interworking can be implemented on the basis of the implementation of IM and E-mail interworking.

Existing techniques for addressing IM and E-mail interworking are just directed to how to transfer messages sent from a service user on one side to a service receiver on the other side without taking the implementation of directly making a message reply to the original message sender by the receiver into account.

SUMMARY OF THE INVENTION

In view of the above, the main objective of the disclosure is to provide a method and system for implementing IM and E-mail interworking, which can implement IM and E-mail interworking.

To achieve the above objective, the disclosure provides a method for implementing IM and E-mail interworking. The method comprises corresponding an IM user applying a service of IM and E-mail interworking to at least one E-mail address, either being constructed from an IM address of the IM user or being a pre-allocated E-mail address, and the method further comprises:

determining, from a received IM, the E-mail address of a destination user, converting the IM into an E-mail, and sending the E-mail to the E-mail address of the destination user; or determining, from a received E-mail initiated by an E-mail user, the IM address of a destination user, converting the E-mail into an IM, and sending the IM to the IM address of the destination user.

Preferably, determining, from the IM, the E-mail address of the destination user may comprise:

determining whether the receiving address of the destination user in the IM is an E-mail address or not, if so, determining the E-mail address as the receiving address of the destination user, otherwise finding out the E-mail address of the destination user corresponding to the IM address of the destination user according to the IM address of the destination user in the IM;

determining, from the E-mail, the IM receiving address of the destination user may comprise:

finding out the IM address corresponding to the E-mail address of the destination user, according to the E-mail address of the destination user in the E-mail.

Preferably, converting the IM into the E-mail may comprise:

determining and mapping an E-mail address corresponding to an origin user in the IM into a parameter "from" in the E-mail, setting a parameter "date" in the IM or the current time information to a parameter "orig-date" in the E-mail, setting a parameter "to" in the E-mail to the E-mail address of the destination user in the IM, setting "imdn.Disposition-Notification" in the IM to "positive-delivery" or "negative-delivery", setting a parameter "Disposition-Notification-To" in the E-mail to "required", setting "disposition-type" in the E-mail to "displayed" when the "imdn.Disposition-Notification" in the IM is set to "display", and directly using the IM as the content of the E-mail when the type of the message content of the IM is text, or directly constructing an E-mail header and an E-mail body of a multipurpose Internet E-mail extensions (MIME) type when the type of the message content of the IM is MIME; and converting the E-mail into the IM comprises: using the parameter "from" in the E-mail header as the origin user address in the IM, using an IM address converted by a command parameter "RCPT To" as the destination user address of the IM, setting the parameter "imdn.Disposition-Notification" in the IM to "positive-delivery" or "negative-delivery" when the parameter "Disposition-Notification-To" in the E-mail header is "required", setting the "imdn.Disposition-Notification" in the IM to "display" when the parameter "disposition-type" in the E-mail header is "displayed", and using the content of the E-mail as the message body of the IM.

Preferably, sending the converted E-mail to the determined receiving address of the destination user may comprise:

initiating a domain name server (DNS) query according to the E-mail address of the destination user, acquiring the address of a Simple Mail Transfer Protocol (SMTP) server to which the destination user belongs, establishing a transmission channel, sending the command "DATA" to the SMTP server to which the destination user belongs, and sending the E-mail converted from the IM; and sending the converted IM to the determined receiving address of the destination user comprises: determining an IM system corresponding to the IM address of the destination user, sending the converted IM to the IM system, and sending, by the IM system, the converted IM to the receiving address of the destination user.

Preferably, if the E-mail, when being converted into an IM, has a content of exceeding a size (i.e., 1300 bytes) of a pager mode IM, the content of the E-mail may be converted into two or more Message Session Relay Protocol (MSRP) messages.

Preferably, when the message content of the IM is transferred as a MSRP message, the message contents of the received MSRP messages may be cached, the cached message contents may be constructed as a complete message after all MSRP message are received, and the complete message may be converted into the E-mail.

The disclosure also provides a system for implementing IM and E-mail interworking. The system comprises a setting unit, a receiving unit, a first determining unit, a converting unit and a sending unit, wherein the setting unit is configured to set an IM user applying a service of IM and E-mail interworking to correspond to at least one E-mail address, either being constructed from an IM address of the IM user or being a pre-allocated E-mail address;

the receiving unit is configured to receive the IM or E-mail from the user;

the first determining unit is configured to determine an E-mail address of a destination user from a received IM or determining an IM address of a destination user from a received E-mail of a user;

the converting unit is configured to convert the received IM into a E-mail or the received E-mail into an IM; and the sending unit is configured to determine the E-mail address of the destination user from the received IM, convert the IM into a E-mail, and send the E-mail to the E-mail address of the destination user, or to determine the IM address of the destination user from a received E-mail initiated by the E-mail user, convert the E-mail into an IM, and send the IM to the IM address of the destination user.

Preferably, the first determining unit may be further configured to determine whether the receiving address of the destination user in the IM is an E-mail address or not, if so, determine the E-mail address as the receiving address of the destination user, otherwise find out the E-mail address of the destination user corresponding to the IM address of the destination user, according to the IM address of the destination user in the IM; and the first determining unit may be further configured to find out the IM address corresponding to the E-mail address of the destination user, according to the E-mail address of the destination user in the E-mail.

Preferably, the system may further comprise:

a second determining unit, configured to determine the E-mail address of an origin user in the IM; and, wherein the converting unit is further configured to map the E-mail address of the origin user in the IM determined by the second determining unit into a parameter "from" in a E-mail, to set a parameter "date" in the IM or the current time information to a parameter "orig-date" in the E-mail, to set a parameter "to" in the E-mail to the E-mail address of the destination user in the IM, to set "imdn.Disposition-Notification" in the IM to "positive-delivery" or "negative-delivery", to set a parameter "Disposition-Notification-To" in the E-mail to "required", to set "disposition-type" in the E-mail to "displayed" when the "imdn.Disposition-Notification" in the IM is set to "display", and to directly use the IM as the content of the E-mail when the type of the message content of the IM is text, or to directly construct an E-mail header and an E-mail body of a multipurpose Internet E-mail extensions (MIME) type when the type of the message content of the IM is MIME; and the converting unit is further configured to use the parameter "from" in the E-mail header as the origin user address in the IM, to use an IM address converted by a command parameter "RCPT To" as the destination user address of the IM, to set the parameter "imdn.Disposition-Notification" in the IM to "positive-delivery" or "negative-delivery" when the parameter "Disposition-Notification-To" in the E-mail header is "required", to set the "imdn.Disposition-Notification" in the IM to "display" when the parameter "disposition-type" in the E-mail header is "displayed", and to use the content of the E-mail as the message body of the IM.

Preferably, the sending unit may be further configured to initiate a domain name server (DNS) query according to the E-mail address of the destination user, to acquire the address of an SMTP server to which the destination user belongs, to establish a transmission channel, to send a command "DATA" to the SMTP server to which the destination user belongs, and to send a E-mail converted from the IM; and the sending unit may be further configured to determine an IM system corresponding to the IM address of the destination user, to send the converted IM to the IM system, and to send the converted IM to the receiving address of the destination user through the IM system.

Preferably, if the E-mail, when being converted into an IM by the converting unit, has a content of exceeding a size (i.e., 1300 bytes) of a pager mode IM, the content of the E-mail may be converted into two or more MSRP messages.

Preferably, the system may further comprise: a cache unit and a third determining unit, wherein the cache unit is configured to cache the message contents of the received MSRP messages when the message content of the IM is transferred as a MSRP message; and the third unit is configured to determine whether all MSRP messages are received or not, and to trigger the converting unit to construct the cached message contents as a complete message and convert the complete message into a E-mail, upon reception.

In the disclosure, conversion between the IM and E-mail sent by a user is implemented through arranging an interworking server between an IM system and an E-mail server, and then the converted E-mail or the IM is sent to the E-mail address or IM receiving address in the E-mail or IM, corresponding to the destination user, so that the interworking between IM and E-mail can be implemented. The technical scheme of the disclosure is simple in implementation and is practical and the implementation cost is low.

DETAILED DESCRIPTION OF THE INVENTION

The basic idea of the disclosure is arranging an interworking server between an IM system and an E-mail server to implement conversions between an IM and E-mail sent by a user, and then sending the converted E-mail or the IM to an E-mail address or IM receiving address in the Email or IM, corresponding to a destination user, so that a interworking between IM and E-mail can be implemented.

The disclosure is explained below in detail by setting forth the following embodiments and with reference to the accompanying drawings, in order to clarify the object, technical scheme and advantages of the disclosure.

Figure 1:
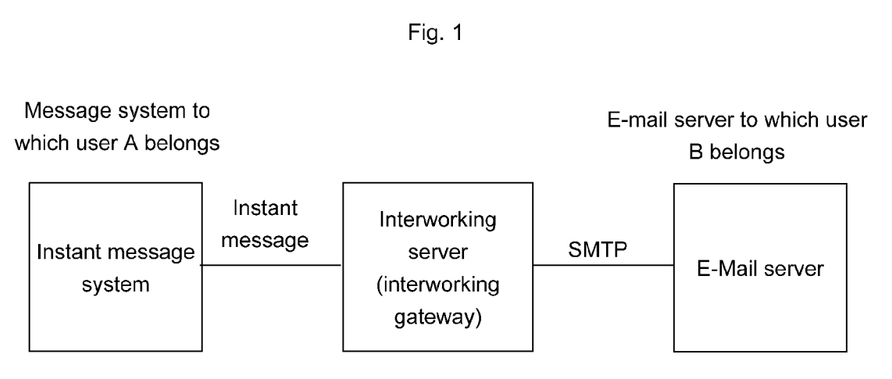
FIG. 1 shows a block diagram of a structure for implementing IM and E-mail interworking.

FIG. 1 shows a block diagram of a structure for implementing IM and an E-mail interworking. As show in FIG. 1, the IM and E-mail interworking is implemented by an interworking server (also referred to as an interworking gateway) arranged between an IM system and an E-mail server; an IM from an IM service origin user, namely user A, can be converted into an E-mail by the interworking server, sent to the E-mail server, and forwarded to a destination user, namely user B, by the E-mail server; the destination user of the E-mail, namely user B, can directly reply to the E-mail, and the reply is converted, by the interworking server, into an IM which is sent to the IM origin user, namely user A.

In the disclosure, the interworking server acts as an E-mail client in receiving an IM from the IM system and converting the IM into an E-mail for sending, and acts as an E-mail server in receiving an E-mail and converting the E-mail into an IM. Thus, it is necessary for the interoperation server to have a server domain name as an E-mail server. The disclosure can configure the domain name of the IM system as that of the interworking system. If multiple IM systems are connected to the same interworking server simultaneously, the interworking server is configured with multiple domain names, each being corresponding to an IM system. A user identifier in an IM is indicated by an SIP Uniform Resource Identifier (URI) in the format of sip:username@messageDomain.com or sip:+86-13812345678@messageDomain.com if converted by Tel URI. The E-mail address in an E-mail system is in the format of user@E-mailDomain.com. In this case, the E-mail address of the origin user in the IM in the E-mail system corresponds to the SIP identifier of the origin user, that is, the user name in the SIP URI is mapped into the user name in the E-mail address and the domain name in the SIP URI is mapped into the domain name in the E-mail address, Conversely, if a the SIP user identifier is constructed from an E-mail address, there is a reversed correspondence relationship.

The interworking server in the disclosure can further has an independent E-mail server domain name, and if an IM user of an IM system connected to the interworking server applies the interworking service with an E-mail, he could be pre-configured with an E-mail address to use when the intercommunication occurs, wherein the domain name of the E-mail address is that of the interworking server, and the user name of the E-mail address is set by the user or allocated by the E-mail server. In such a case, the E-mail address of the origin user in the IM in the E-mail system is a preconfigured E-mail address. The preconfigured E-mail addresses can be collectively stored in the interworking server or IM system; the preconfigured E-mail address can also be stored in an external user information management server and read by the interworking server; wherein the user information management server is a dedicated server, which is configured to store correspondence relationship between user identifiers and E-mail addresses.

In the two ways above, a one-to-one correspondence relationship between the user identifier of IM user and the E-mail address or preconfigured E-mail address is established, and the interworking server performs the conversion according to the correspondence relationship; and an E-mail can be sent to the IM user according to the corresponding E-mail address or preconfigured E-mail address, since the domain name of the E-mail address is that of the interworking server, the E-mail will be sent to the interworking server, and transferred into IM which is sent to the IM user, so that the interworking can be implemented.

The E-mail address construction of the destination user in the IM, namely message receiving user, can be divided into two types. When the origin user directly initiates an IM to the E-mail address of the destination user, the destination user identifier in the IM is corresponding to the E-mail address of the destination user. In addition, the E-mail address of the destination user can also be acquired by the user information management server outside interworking server query system. Alternatively, when the origin user initiates an IM, the interworking server acquires the E-mail address of the destination user from the user identifier of the destination user.

How IM and E-mail interworking may be implemented will be explained in detail below by specific embodiments.

It is assumed that user A is an IM service user, and user B is an E-mail service user, and any systems between user A and the interworking sever will not be described for the purpose of emphasizing the main point.

The IM can be classified into pager mode and large message mode, and the interworking server employs different processing ways according to the two different ways.

Figure 2:
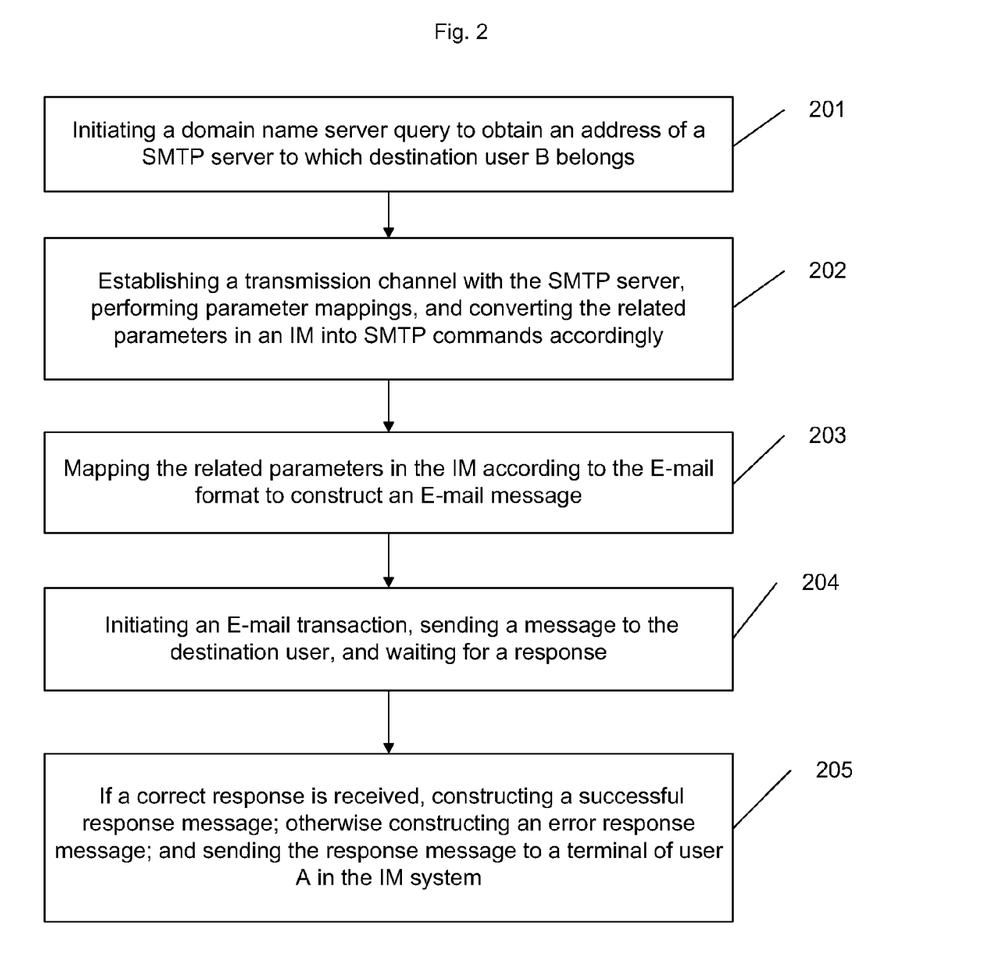
FIG. 2 shows a flowchart of converting an IM into an E-mail of the disclosure.

The process of initiating a pager mode IM to user B by user A is that: when receiving an IM (SIP message) initiated in the pager mode from the terminal of user A, the interworking server translates the IM, constructs parameters according to the SMTP, generates an E-mail conforming to the E-mail format, and sends the E-mail to an E-mail server to which user B belongs. FIG. 2 shows a flowchart of converting an IM into an E-mail of the disclosure, as show in FIG. 2, the steps of converting the IM into the E-mail by the interworking server are as follows:

Step 201: Initiating a Domain Name Server (DNS) query to obtain an address of an SMTP server to which the destination user, namely user B, belongs.

The interworking server initiates the DNS query according to the domain name of the E-mail address of the destination user, namely user B. The E-mail address can be the E-mail address corresponding to the user identifier in the IM as described above, or the E-mail address of user B acquired through directly querying the user information management server outside the system by the interworking server. Specifically, the identifier of user A is used as that of the origin sender in the IM generated by IM user A, and the E-mail address of user A can be constructed by the method above; the identifier of user B can be used as that of the destination user, or the E-mail address of user B can be directly used as the identifier of the destination user. When the E-mail address of user B is used as the identifier of the destination user, the interworking server performs name resolution by using the domain name in the E-mail address of user B, and acquires the E-mail server, namely SMTP server, where the E-mail address of user B is located; and when the identifier of user B is used as that of the destination user, the interworking server searches the corresponding E-mail address through the user information management server according to the identifier information of user B upon reception of an IM, so as to obtain the E-mail address of user B.

Step 202: establishing a transmission channel with the SMTP server, namely E-mail server, performing parameter mappings, and converting the related parameters in the IM into SMTP commands accordingly.

The interworking server constructs parameters for the SMTP commands as follows: the return address parameter (reverse-path) in a SMTP command MAIL FROM is the E-mail address of the origin user, namely user A, wherein the E-mail address can be the E-mail address corresponding to user A as described above, and the E-mail address can also be a preconfigured E-mail address directly acquired by the interworking server from an external user information management server; the transfer address parameter (forward-path) in the SMTP command RCPT TO is the E-mail address of the destination user in step 201. If the number identifier of user A is directly used as the user name of an E-mail, the interworking server directly generates the E-mail address of user A according to the domain name thereof, such as +86-13812345678@messageDomain.com described above and the like, or acquires an E-mail address set by user A from the user information management server according to the identifier of user A, which is any E-mail address set by the user or allocated by the interworking server for user A.

Step 203: mapping the related parameters in the IM according to the E-mail format to construct an E-mail message.

The interworking server constructs parameters in the E-mail header of the E-mail message as follows: the above E-mail address of the origin user in step 202 is mapped into a parameter "from"; a parameter "orig-date" can be set to "date" in the IM or set to the local current time by the interworking server; the parameter "message-id" is generated by the interworking server; the parameter "to" is the same as the transfer address (forward-path) in the RCPT To command; if a parameter "subject" is included in the IM, the parameter "subject" is corresponding to that of the E-mail header; when a delivery notification (imdn.Disposition-Notification) in the IM is set to "positive-delivery" or "negative-delivery" or both of them, the "Disposition-Notification-To" is set to "required"; when the delivery notification (imdn.Disposition-Notification) in the IM is set to "display", the "disposition-type" is set to "displayed"; if the message content type of the IM is text/plain, the message content is directly used as the E-mail body; and if the message content type of the IM is MIME, the MIME E-mail header and body are constructed according to the MIME E-mail format.

Step 204: initiating an E-mail transaction, sending a message to the destination user and waiting for a response.

The interworking server sends command DATA to the E-mail server to which the destination user namely user B, belongs, sends the E-mail constructed in step 203 after the E-mail server returns a 354 Intermediate reply, maintains the service, and waits for the response after all data are sent.

Step 205: if a correct response is received, constructing a successful response message, for example SIP 202 accepted message, otherwise constructing an error response message; and sending the response message to a terminal of user A in the IM system.

Figure 3:
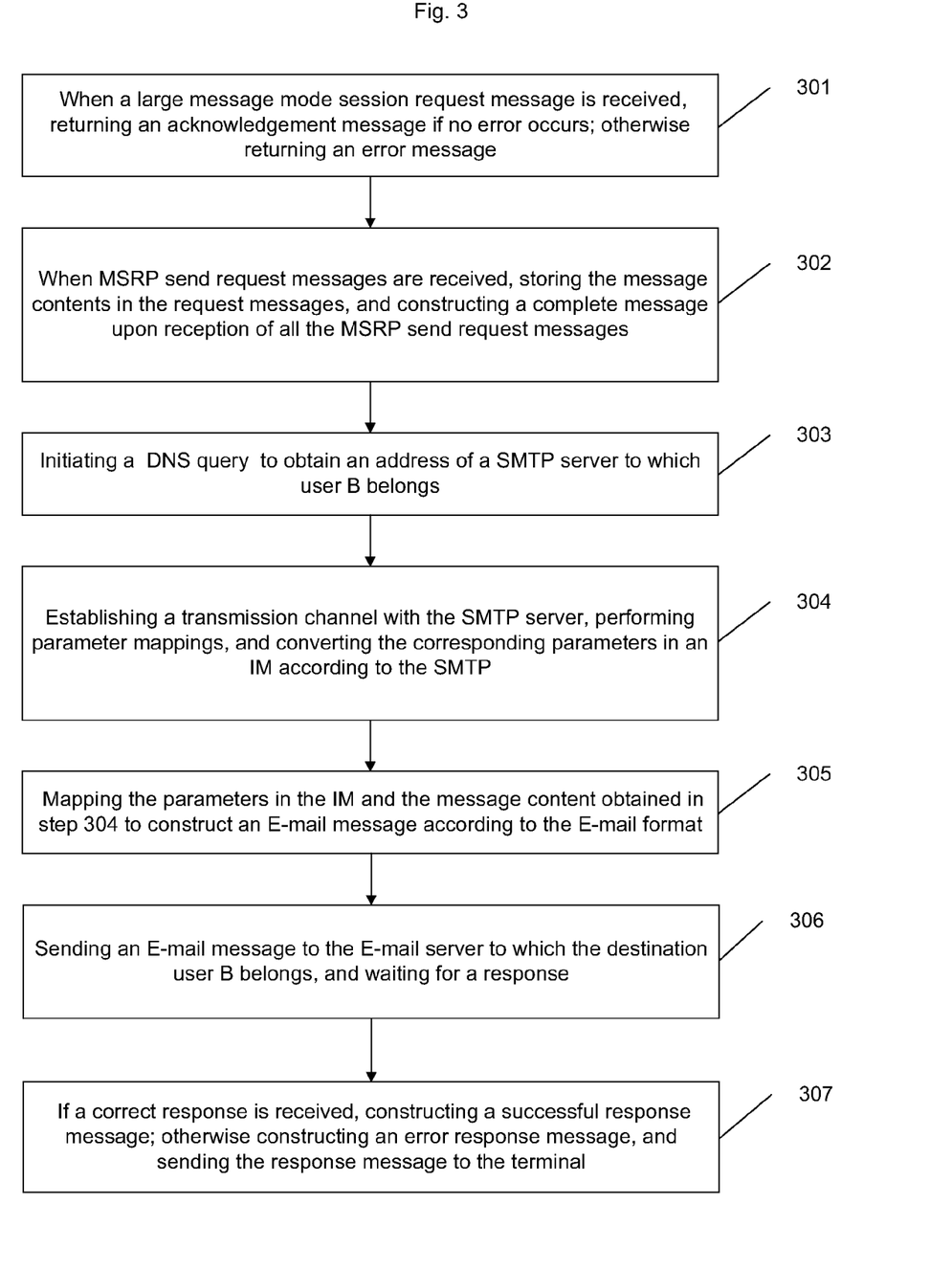
FIG. 3 shows another flowchart of converting an IM into an E-mail of the disclosure.

The processes of initiating a large message mode IM to user B by user A include: when receiving an IM initiated through the large message mode from the terminal of user A, the interworking server first receives an originating message, for example SIP Invite message, receives one or more Message Session Relay Protocol (MSRP) based MSRP SEND messages, caches the message contents received in the MSRP SEND messages, translates the originating message, constructs parameters according to the SMTP, generates an E-mail conforming to the E-mail format, and sends the E-mail to the E-mail server to which user B belongs. FIG. 3 shows another flowchart of converting an IM into an E-mail of the disclosure, as show in FIG. 3 the steps of converting the IM into the E-mail by the interworking server are as follows.

Step 301: when a large message mode session request message is received, returning an acknowledgement message if no error occurs, otherwise, returning an error message.

Step 302: when the subsequent MSRP SEND request messages carrying the message contents are received, storing the message contents in the request messages temporarily, and constructing complete message from all the received message contents upon reception of all MSRP SEND request messages.

Step 303: initiating a DNS query to obtain the address of an SMTP server to which the destination user, namely user B, belongs.

Step 304: establishing a transmission channel to the SMTP server, performing parameter mappings, and converting the related parameters in the IM according to the SMTP.

Step 305: mapping the parameters in the IM and the message content obtained in step 304 to construct an E-mail message according to the E-mail format, wherein the E-mail content is constructed from the message contents temporarily stored in step 302.

Step 306: sending the E-mail message to the E-mail server to which the destination user, namely user B, belongs, and wait for a response.

Step 307: if a correct response is received, constructing a successful response message, for example SIP 202 accepted message, otherwise, constructing an error response message, and sending the error response message to the terminal.

In the steps 303 to 305, operations, except for the construction of the E-mail content, are the same as those described above with respect to initiating the pager mode IM to user B by user A.

For sending an E-mail from user B to user A, there are two cases: one is that user B directly replies to the E-mail converted by the interworking server from the IM which is sent from user B to user A, the other is that user B directly sends an E-mail to user A. In both cases, the sender address is the E-mail address of user B, and the receiver address is the corresponding E-mail address or preconfigured E-mail address of user A.

When receiving an E-mail initiated by the E-mail server to which user B belongs, the interworking server translates the E-mail message content carried by the SMTP, performs construction of parameters from E-mail to IM, generates an IM conforming to the IM format, and sends the IM to user A in the pager mode or large message mode according to the message size.

Figure 4:
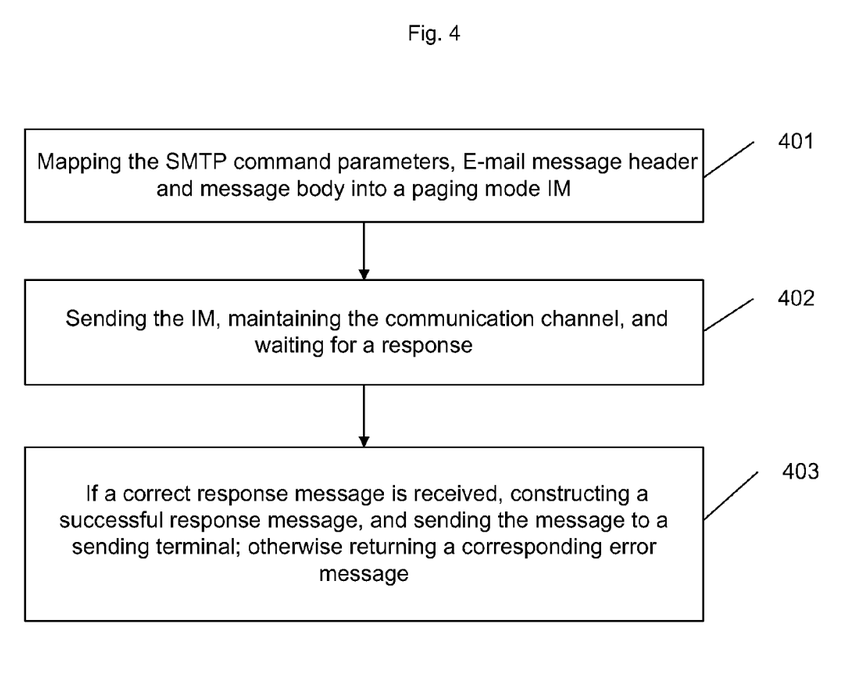
FIG. 4 shows a flowchart of converting an E-mail into an IM of the disclosure.

The conversion processes from E-mail into pager mode IM initiated by user B include: after receiving EHLO or HELO and the subsequent SMTP commands such as E-mail FROM and RCPT TO, the interworking server waits for the completion of receiving data DATA, and when the interworking server determines that the E-mail content does not exceeds 1300 bytes, it constructs a pager mode IM, wherein 1300 is the maximum number of byte of an IM in the pager mode. FIG. 4 shows a flowchart of converting an E-mail into an IM of the disclosure, as show in FIG. 4 the steps of converting the E-mail into the IM by the interworking server are as follows.

Step 401: mapping the SMTP command parameters, E-mail message header and message body into a pager mode IM.

The interworking server constructs message parameters of the IM as follows: the parameter "from" in the E-mail header is mapped into the identifier of the origin user in the IM; because the conversion is from E-mail into IM, the identifier of the destination user in the IM is generated by the reversed conversion of the E-mail address in the above method; and the E-mail address of user B can be directly used as the identifier of the origin user in the IM. The command parameter RCPT To is mapped into the identifier of the destination user in the IM; if a parameter "subject" is included in the E-mail header, the parameter "subject" is mapped into the parameter "subject" in the IM; if the parameter "Disposition-Notification-To" in the E-mail header is "required", the delivery notification (imdn.Disposition-Notification) in the IM is set to "positive-delivery" or "negative-delivery" or both of them; if "disposition-type" in the E-mail header is "displayed", the delivery notification (imdn.Disposition-Notification) in the IM is set to "display"; and the E-mail content is mapped into the message body in the IM.

This embodiment is available to case in which the E-mail has a content of not more than 1300 bytes.

Step 402: sending the IM, maintaining the communication channel, and waiting for a response.

Step 403: if a correct response message, for example SIP 200 OK message, is received, constructing a successful response message, for example 250 OK message, and send the message to a sending terminal, otherwise returning a corresponding error message.

Figure 5:
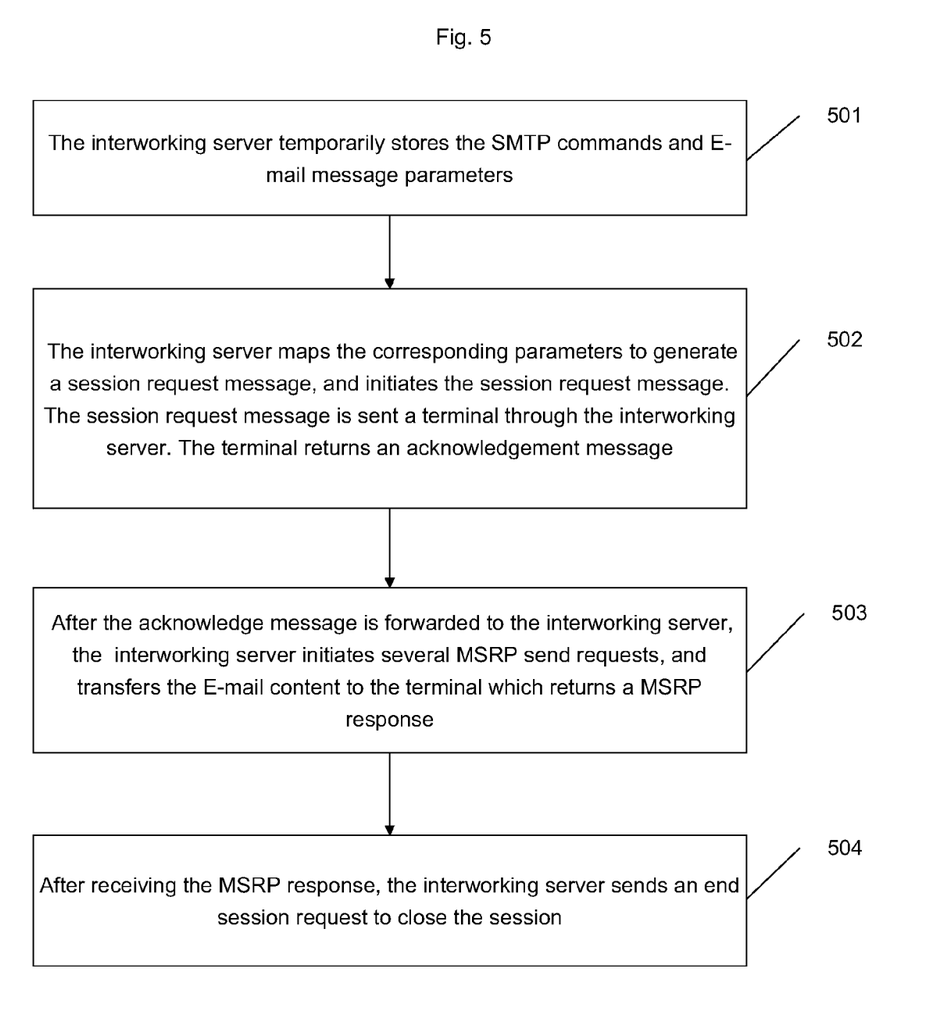
FIG. 5 shows another flowchart of converting an E-mail into an IM of the disclosure.

User B initiates a conversion process from E-mail into pager mode IM as follows: after receiving EHLO or HELO and the subsequent SMTP commands such as E-mail FROM and RCPT TO command, the interworking server waits for the completion of receiving data DATA; if the interworking server determines that the E-mail has a content of exceeding 1300 bytes, it constructs a large message mode IM, that is to say, first, temporarily stores the SMTP commands and E-mail message parameters, maps the corresponding parameters to generate a session request messages as described above and initiates a session request message. After an acknowledgement message is received, several MSRP SEND requests are initiated to transfer the E-mail content. After an MSRP response is received, an end session request is sent to close the session. FIG. 5 shows another flowchart of converting an E-mail into an IM of the invention, as show in FIG. 5, the steps of converting the E-mail into the IM by the interworking server are as follows:

Step 501: the interworking server temporarily stores the SMTP commands and E-mail message parameters.

Step 502: the interworking server maps the corresponding parameters to generate a session request message, and initiates a session request message. The session request message is sent to a terminal through the interworking server. The terminal returns an acknowledgement message.

The way of the mapping is the same as that in step 401, and only the mapped content is slightly different.

Step 503: after the acknowledgement message is forwarded to the interworking server, the interworking server initiates several MSRP SEND requests, and transfers the E-mail content to the terminal which returns a MSRP response.

Step 504: the interworking server sends an end session request to close the session after receiving the MSRP response.

The solution above is not limited to IM, and also available to other instant interactive message services based on the IM extensions, for example Converged IP Messaging (CPM) service being studied by the International Standards Organization Open Mobile Alliance (OMA).

The disclosure is especially suitable for the following application scenarios: it is assumed that both users A and B are the converged messaging service users, and when user B is offline, the preference setting of user B is to send the offline messages to the mailbox of user B in case of off line; or, when user B is online, the preference setting of user B is to forward the converged message to the mailbox of user B instead of receiving IM currently. In both cases, the converged message sent from user A can be converted into E-mail message to be sent to mailbox of user B through the interworking function with E-mail provided by the interworking server.

Figure 6:
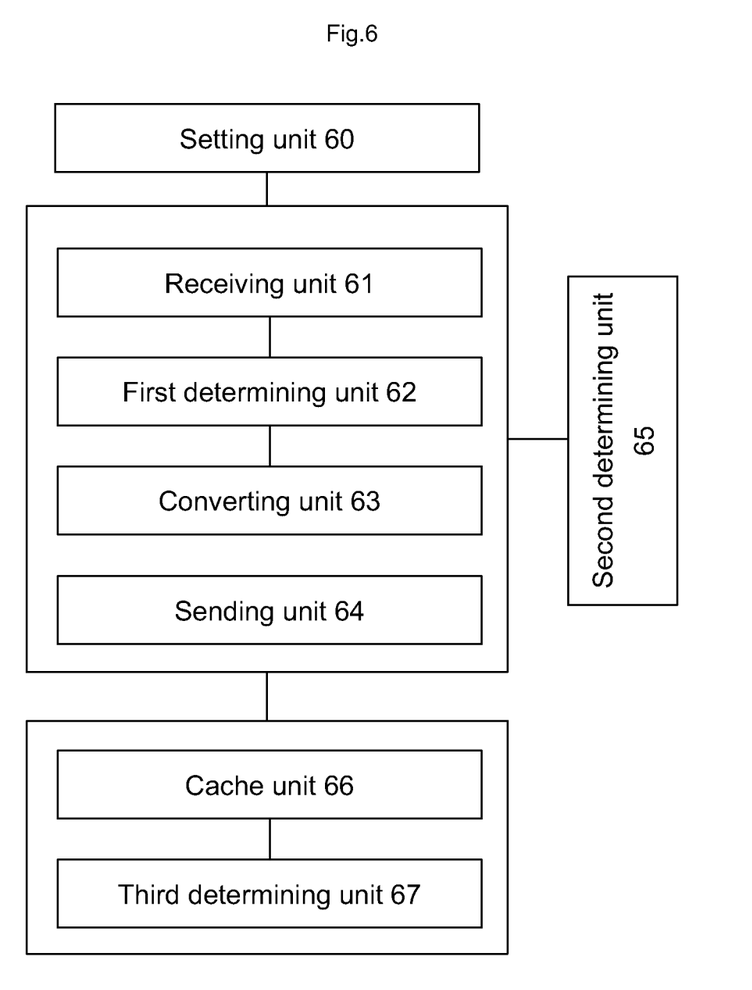
FIG. 6 shows a block diagram of a system for implementing IM and E-mail interworking of the disclosure.

FIG. 6 shows a block diagram of a system for implementing IM and E-mail interworking of the disclosure, as shown in FIG. 6, the system for implementing IM and E-mail interworking of the disclosure comprises a setting unit 60, a receiving unit 61, a first determining unit 62, a converting unit 63 and a sending unit 64, wherein the setting unit 60 is configured to set an IM user applying the service of IM and E-mail interworking to correspond to at least one E-mail address, either being constructed from an IM address of the IM user or being a pre-allocated E-mail address; wherein the E-mail address is used as the address of an origin user in the E-mail converted from the IM and the address of a destination user in the E-mail replied by the E-mail user; the receiving unit 61 is configured to receive an IM or an E-mail from the user; the first determining unit 62 is configured to determine the E-mail address of a destination user from the received IM or determining the IM address of the destination user from the received E-mail of the user; the converting unit 63 is configured to convert the received IM into an E-mail or converting the received E-mail into an IM; and the sending unit 64 is configured to determine the E-mail address of the destination user from a received IM, converting the IM into an E-mail, and sending the E-mail to the E-mail address of the destination user, or determining the IM address of a destination user from a received E-mail initiated by the E-mail user, converting the E-mail into an IM, and sending the IM to the IM address of the destination user.

Wherein, the first determining unit 62 determining the E-mail receiving address of the destination user from the IM comprises: determining whether the receiving address of the destination user in the IM is an E-mail address or not, if so, determining the E-mail address as the receiving address of the destination user, otherwise finding out the E-mail address of the destination user corresponding to the IM address of the destination user according to the IM address of the destination user in the IM and determining the same as the receiving address of the destination user; and the first determining unit 62 determining the IM receiving address of the destination user from the E-mail comprises: finding out the IM address corresponding to the E-mail address of the destination user according to the E-mail address of the destination user in the E-mail, and determining the same as the receiving address of the destination user.

As shown in FIG. 6, the system for implementing IM and E-mail interworking further comprises a second determining unit 65, configured to determine the E-mail address of the origin user in the IM; the converting unit 63 converting the IM into an E-mail comprises: mapping the E-mail address of the origin user in the IM determined by the second determining unit 65 into the parameter "from" in an E-mail, setting the parameter "date" in the IM or the current time information to the parameter "orig-date" in the E-mail, setting the parameter "to" to the E-mail address of the destination user in the IM, setting the "imdn.Disposition-Notification" in the IM to "positive-delivery" or "negative-delivery", setting the parameter "Disposition-Notification-To" in the E-mail to "required", setting the "disposition-type" in the E-mail to "displayed" when the "imdn.Disposition-Notification" in the IM is set to "display", and directly using the IM content as the content of the E-mail when the type of the message content is text/plain, or directly constructing MIME header and body when the type of the message content is MIME type; and the converting unit 63 converting the E-mail into an IM comprises: setting the parameter "from" in the E-mail header to the address of the origin user in the IM, using the IM address determined by the first determining unit 62 for the command parameter "RCPT To" as the address of the destination user of the IM, setting the "imdn.Disposition-Notification" in the IM to "positive-delivery" or "negative-delivery" when the parameter "Disposition-Notification-To" in the E-mail header is "required", setting the "imdn.Disposition-Notification" in the IM to "display" when the parameter "disposition-type" in the E-mail header is "displayed", and using the E-mail content as the message body of the IM. The sending unit 64 sending the converted E-mail to the determined receiving address of the destination user comprises: initiating a DNS query according to the E-mail address of the destination user, acquiring the address of an SMTP server to which the destination user belongs, sending command DATA to the SMTP server to which the destination user belongs, and sending the E-mail converted from the IM; and the sending unit 64 sending the converted IM to the determined receiving address of the destination user, comprises: determining an IM system corresponding to the IM address of the destination user, sending the converted IM to the IM system, and sending the converted IM to the receiving address of the destination user by the IM system. When the E-mail is converted into an IM by the converting unit 63, and the content of the E-mail exceeds a size (i.e., 1300 bytes) of a pager mode IM, the content of the E-mail is converted into two or more MSRP messages.

As shown in FIG. 6, the system for implementing IM and E-mail interworking further comprises: a cache unit 66 and a third determining unit 67, wherein the cache unit 66 is configured to cache the message contents of the received MSRP messages when the message content of the IM is transferred as a MSRP message; and the third determining unit 67 is configured to determine whether all MSRP messages are received, and to trigger the converting unit 63 after all the MSRP message are received; the converting unit 63 constructs a complete message from the cached message contents and converts the complete message into an E-mail.

Those skilled in the art shall understand that the system for implementing IM and E-mail interworking shown in FIG. 6 is designed for implementing the above method for implementing IM and E-mail interworking, and the function of each processing unit in the system shown in FIG. 6 can be understood with reference to the description of the above method, and implemented by the programs running on the processor or by the specific logic circuits. Each processing unit above can be placed in the interworking server.

Those described above are only preferred embodiments of the disclosure, and are not intended to limit the scope of protection of the disclosure.

The invention claimed is:

1. A method for implementing instant message (IM) and E-mail interoperability, comprising corresponding an IM user applying a service of IM and E-mail interoperability to at least one E-mail address, either being constructed from an IM address of the IM user or being a pre-allocated E-mail address, and the method further comprising:
   determining, from a received IM, the E-mail address of a destination user, converting the IM into an E-mail, and sending the E-mail to the E-mail address of the destination user; or
   determining, from an E-mail initiated by an E-mail receiver, the IM address of a destination user, converting the E-mail into an IM, and sending the IM to the IM address of the destination user,
   wherein the method is performed by an interworking server, the IM user sends the IM to the interworking server and the E-mail user sends the E-mail to the interworking server, and
   when the IM user uses the IM to communicate with the E-mail user, the E-mail user replies directly with the E-mail, and when the E-mail user uses the E-mail to communicate with the IM user, the IM user replies directly with the IM.

2. The method according to claim 1, wherein determining from the IM the E-mail address of the destination user comprises: determining whether the receiving address of the destination user in the IM is an E-mail address or not, if so, then determining the E-mail address as the receiving address of the destination user, otherwise finding out the E-mail address of the destination user corresponding to the IM address of the destination user according to the IM address of the destination user in the IM;
   determining, from the E-mail, the IM receiving address of the destination user comprises: finding out the IM address corresponding to the E-mail address of the destination user, according to the E-mail address of the destination user in the E-mail.

3. The method according to claim 2, wherein converting the IM into the E-mail comprises:
   determining and mapping an E-mail address corresponding to an origin user in the IM into a parameter "from" in the E-mail, setting a parameter "date" in the IM or the current time information to a parameter "orig-date" in the E-mail, setting a parameter "to" in the E-mail to the E-mail address of the destination user in the IM, setting "imdn.Disposition-Notification" in the IM to "positive-delivery" or "negative-delivery", setting a parameter "Disposition-Notification-To" in the E-mail to "required", setting "disposition-type" in the E-mail to "displayed" when the "imdn.Disposition-Notification" in the IM is set to "display", and directly using the IM as the content of the E-mail when the type of the message content of the IM is text, or directly constructing an E-mail header and an E-mail body of a multipurpose Internet E-mail extensions (MIME) type when the type of the message content of the IM is MIME; and
   converting the E-mail into the IM comprises:
   using the parameter "from" in the E-mail header as the origin user address in the IM, using an IM address converted by a command parameter "RCPT To" as the destination user address of the IM, setting the parameter "imdn.Disposition-Notification" in the IM to "positive-delivery" or "negative-delivery" when the parameter "Disposition-Notification-To" in the E-mail header is "required", setting the "imdn.Disposition-Notification" in the IM to "display" when the parameter "disposition-type" in the E-mail header is "displayed", and using the content of the E-mail as the message body of the IM.

4. The method according to claim 2, wherein sending the converted E-mail to the determined receiving address of the destination user comprises:
   initiating a domain name server (DNS) query according to the E-mail address of the destination user, acquiring the address of a Simple Mail Transfer Protocol (SMTP) server to which the destination user belongs, establishing a transmission channel, sending the command "DATA" to the SMTP server to which the destination user belongs, and sending the E-mail converted from the IM; and
   sending the converted IM to the determined receiving address of the destination user comprises: determining an IM system corresponding to the IM address of the destination user, sending the converted IM to the IM system, and sending, by the IM system, the converted IM to the receiving address of the destination user.

5. The method according to claim 4, wherein the method further comprises:
if the E-mail, when being converted into an IM, has a content of exceeding a size (i.e. 1300 bytes) of a pager mode IM, converting the content of the E-mail into two or more Message Session Relay Protocol (MSRP) messages.

6. The method according to claim 4, wherein the method further comprises:
when the message content of the IM is transferred as a MSRP message, caching the message contents of the received MSRP messages, constructing the cached message contents as a complete message after all MSRP message are received, and converting the complete message into the E-mail.

7. A system for implementing IM and E-mail interoperability, comprising a setting unit, a receiving unit, a first determining unit, a converting unit and a sending unit, wherein
the setting unit is configured to set an IM user applying a service of IM and E-mail interoperability to correspond to at least one E-mail address, either being constructed from an IM address of the IM user or being a pre-allocated E-mail address;
the receiving unit is configured to receive the IM or E-mail from the user;
the first determining unit is configured to determine from a received IM an E-mail address of a destination user, or to determine an IM address of a destination user from a received E-mail of a user;
the converting unit is configured to convert the received IM into a E-mail or to convert the received E-mail into an IM; and
the sending unit is configured to determine the E-mail address of the destination user from the received IM, convert the IM into a E-mail, and send the E-mail to the E-mail address of the destination user, or to determine the IM address of the destination user from a received E-mail initiated by the E-mail user, convert the E-mail into an IM, and send the IM to the IM address of the destination user,
wherein the setting unit, the receiving unit, the first determining unit, the converting unit and the sending unit are located in an interworking server, the IM user sends the IM to the interworking server and the E-mail user sends the E-mail to the interworking server, and
when the IM user uses the IM to communicate with the E-mail user, the E-mail user replies directly with the E-mail, and when the E-mail user uses the E-mail to communicate with the IM user, the IM user replies directly with the IM.

8. The system according to claim 7, wherein the first determining unit is further configured to determine whether the receiving address of the destination user in the IM is an E-mail address or not, if so, determine the E-mail address as the receiving address of the destination user, otherwise find out the E-mail address of the destination user corresponding to the IM address of the destination user, according to the IM address of the destination user in the IM; and
the first determining unit is further configured to find out the IM address corresponding to the E-mail address of the destination user, according to the E-mail address of the destination user in the E-mail.

9. The system according to claim 8, wherein the system further comprises:
a second determining unit, configured to determine the E-mail address of an origin user in the IM; and, wherein
the converting unit is further configured to map the E-mail address of the origin user in the IM determined by the second determining unit into a parameter "from" in a E-mail, to set a parameter "date" in the IM or the current time information to a parameter "orig-date" in the E-mail, to set a parameter "to" in the E-mail to the E-mail address of the destination user in the IM, to set "imdn.Disposition-Notification" in the IM to "positive-delivery" or "negative-delivery", to set a parameter "Disposition-Notification-To" in the E-mail to "required", to set "disposition-type" in the E-mail to "displayed" when the "imdn.Disposition-Notification" in the IM is set to "display", and to directly use the IM as the content of the E-mail when the type of the message content of the IM is text, or directly constructs an E-mail header and an E-mail body of a multipurpose Internet E-mail extensions (MIME) type when the type of the message content of the IM is MIME; and
the converting unit is further configured to use the parameter "from" in the E-mail header as the origin user address in the IM, to use an IM address converted by a command parameter "RCPT To" as the destination user address of the IM, to set the parameter "imdn.Disposition-Notification" in the IM to "positive-delivery" or "negative-delivery" when the parameter "Disposition-Notification-To" in the E-mail header is "required", to set the "imdn.Disposition-Notification" in the IM to "display" when the parameter "disposition-type" in the E-mail header is "displayed", and to use the content of the E-mail as the message body of the IM.

10. The system according to claim 9, wherein the sending unit is further configured to initiate a domain name server (DNS) query according to the E-mail address of the destination user, to acquire the address of an SMTP server to which the destination user belongs, to establish a transmission channel, to send command "DATA" to the SMTP server to which the destination user belongs, and to send a E-mail converted from the IM; and
the sending unit is further configured to determine an IM system corresponding to the IM address of the destination user, to send the converted IM to the IM system, and to send the converted IM to the receiving address of the destination user through the IM system.

11. The system according to claim 10, wherein if the E-mail, when being converted into an IM by the converting unit, has a content of exceeding the size (i.e. 1300) of a pager mode IM, the content of the E-mail is converted into two or more MSRP messages.

12. The system according to claim 10, wherein the system further comprises: a cache unit and a third determining unit, wherein
the cache unit is configured to cache the message contents of the received MSRP messages when the message content of the IM is transferred as a MSRP message; and
the third unit is configured to determine whether all MSRP messages are received or not, and to trigger the converting unit to construct the cached message contents as a complete message and convert the complete message into a E-mail, upon reception.

* * * * *